United States Patent [19]
Abodishish et al.

[11] Patent Number: 5,133,865
[45] Date of Patent: Jul. 28, 1992

[54] PROCESS FOR PRODUCING A HAFNIUM EXTRACTION SCRUB SOLVENT

[75] Inventors: Hani A. Abodishish, Aiken, S.C.; Douglas J. Leavitt, Ogden, Utah

[73] Assignee: Westinghouse Electric Corp., Pittsburgh, Pa.

[21] Appl. No.: 698,439

[22] Filed: May 10, 1991

[51] Int. Cl.$^5$ .............................................. B01D 11/00
[52] U.S. Cl. ................................ 210/634; 210/638; 210/639; 210/663; 210/666; 423/70
[58] Field of Search ............... 210/634, 635, 638, 639, 210/663, 666, 688; 423/70, 73

[56] References Cited

U.S. PATENT DOCUMENTS

| | | | |
|---|---|---|---|
| 2,566,665 | 9/1951 | Huffman et al. | 423/73 |
| 2,938,769 | 7/1952 | Overholser et al. | 423/73 |
| 3,006,719 | 10/1961 | Miller | 423/73 |
| 3,032,388 | 10/1957 | McCord et al. | 423/73 |
| 4,873,072 | 10/1989 | Abodishish | 423/70 |

Primary Examiner—Robert A. Dawson
Assistant Examiner—Ana M. Fortuna
Attorney, Agent, or Firm—J. C. Valentine

[57] ABSTRACT

A scrub solution is made up for use in starting up a hafnium liquid-liquid extraction system. An aqueous zirconium oxychloride-containing solution is contacted with methyl isobutyl ketone containing less than 1 Molar thiocyanic acid. The aqueous solution is maintained at a chloride concentration of 1.6 to 3.5 Normal (as HCl) by addition of concentrated hydrochloric acid. Ammonium thiocyanate is added to the acidified aqueous stream to produce thiocyanic acid. The high acidity of the aqueous solution drives the thiocyanic acid into the methyl isobutyl ketone without the chloride anions having a depressing affect on the transfer. The thiocyanic acid-containing MIBK may then be used as a scrubbing solvent to start up the hafnium extraction system.

8 Claims, 1 Drawing Sheet

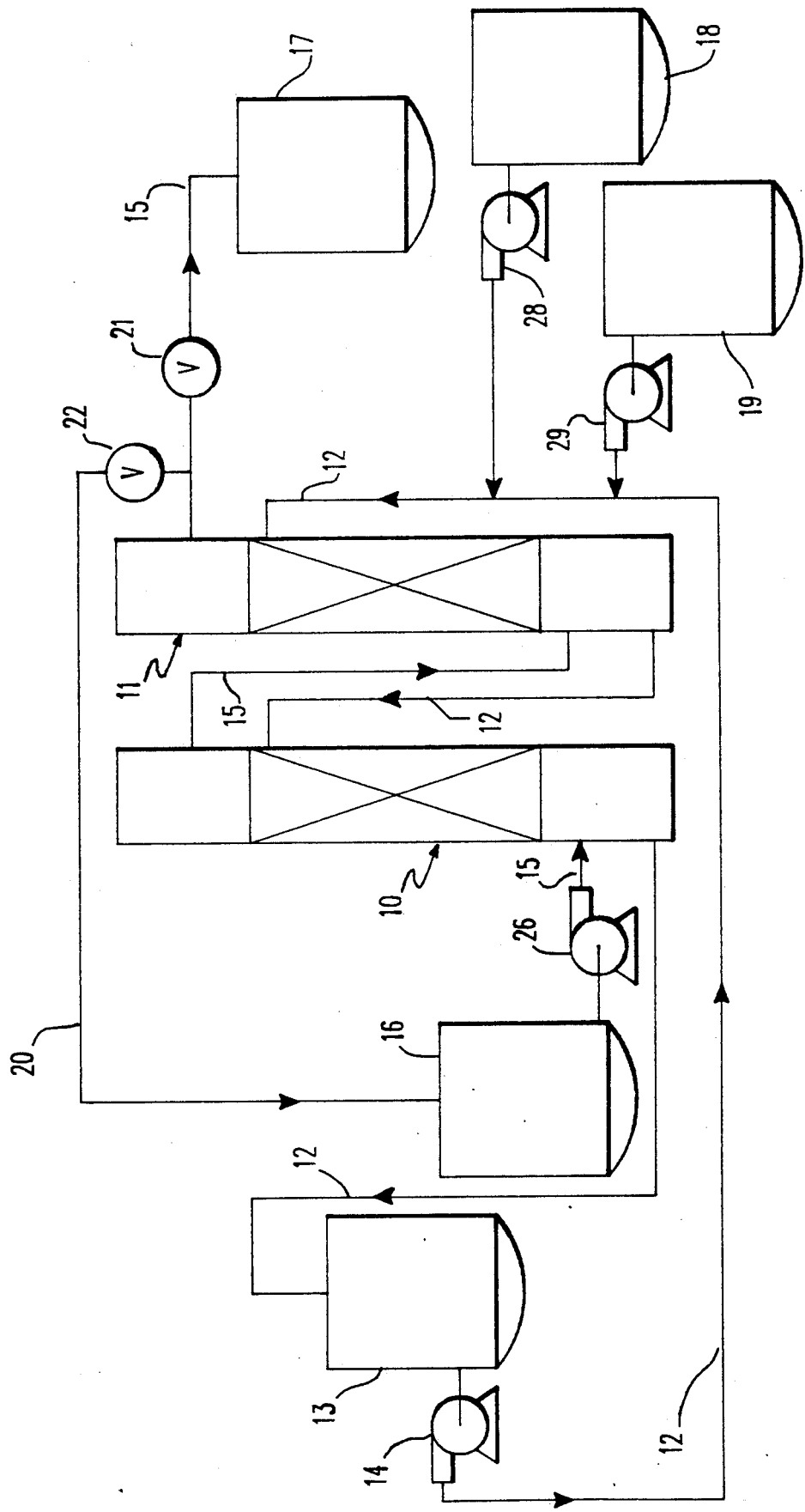

PROCESS FOR PRODUCING A HAFNIUM EXTRACTION SCRUB SOLVENT

BACKGROUND OF THE INVENTION

The invention relates to a process for producing a hafnium extraction scrub solvent for extracting (or "scrubbing") hafnium values from aqueous mixtures of zirconium and hafnium oxychloride. It is particularly concerned with the production of a thiocyanic acid-containing organic solvent for use in the start-up of a liquid-liquid extraction process.

The commercial production of zirconium metal from zircon sand involves the chlorination of the sand, which produces an intermediate process stream generally comprising a zirconium/hafnium oxychloride aqueous solution. The metal values may, if desired, then be separated in accordance with known practices. In one of these practices, the hafnium values are scrubbed from the mixed oxychloride-containing aqueous stream in a liquid-liquid process with a so-called "scrub" solvent comprising an originally barren organic solvent (usually methyl isobutyl ketone, also known as "MIBK") which has been made up to contain about 2–3 Molar of thiocyanic acid.

In a conventional start-up of a hafnium extraction system, scrub solution is made up by contacting an aqueous solution of dilute sulfuric acid containing thiocyanic acid with a barren organic solvent containing little, if any, thiocyanic acid, such as fresh or regenerated MIBK. As used in the context of the present disclosure, a "barren" organic solvent is one that has a thiocyanic acid concentration of less than about 1 Molar. Typically, even regenerated barren solvents contain substantially less thiocyanic acid. The aqueous solution preferably contains less than about 100 ppm hafnium ions, and more preferably less than about 50 ppm hafnium ions, so that hafnium-SCN complex ions do not consume the thiocyanic acid. An aqueous ammonium thiocyanate solution, typically having a pH of about 10, is added to the process to produce thiocyanic acid in the aqueous solution. The thiocyanic acid then gradually transfers to the organic solvent and builds up to the desired scrub solvent concentration of about 2 Molar or more. This system runs at the inherent pH of the aqueous stream. This conventional start up practice requires an extended period of time to achieve a scrub solvent concentration of 2 Molar or more.

Concentrated sulfuric acid was added in a conventional start up of a production facility with the expectation that an increase in the acidity of the dilute, thiocyanic acid-containing, sulfuric acid solution would more quickly drive the thiocyanic acid into the barren organic solvent. However, after three or four days into the start up, the thio ("SCN") concentration of the scrub solvent was found to be only 1.0–1.3 Molar. In addition, a large quantity of thio-contaminated sulfuric acid was produced, with consequent loss of the thio.

A process for starting up a hafnium extraction system in a shorter time with less waste generation and loss of feed materials is needed to more efficiently separate hafnium from zirconium.

SUMMARY OF THE INVENTION

It is an object of the present invention to more efficiently make up scrub solutions in order to start up hafnium liquid-liquid extraction systems.

It is another object of the present invention to make up scrub solvents in shorter periods of time with less waste generation and feed losses than are experienced in conventional start ups employing sulfuric acid to drive thiocyanic acid from aqueous solutions into scrub solvents.

It is a further object of the present invention to make up scrub solvents without employing sulfuric acid solutions to transfer thiocyanic acid into the solvents. The present invention was made after it was found that, although a highly acidic (low pH) condition in the sulfuric acid solution would be expected to be desirable phase, the presence of more than about 50 milligrams/liter of sulfate radical in the aqueous sulfuric acid solution actually depresses the transfer of the thiocyanic acid into the solvent phase. It is hypothesized that the sulfate radicals may be forming ion complexes with the thiocyanic acid in highly acidic solutions.

With these objects in view, the present invention resides in an improvement of making up a scrub solvent by contacting an aqueous zirconium oxychloride-containing solution with a barren organic solvent. Hydrochloric acid is added to the aqueous solution to maintain a chloride ion concentration of at least about 1.6 Normal (as HCL) in the zirconium oxychloride-containing stream. In a preferred practice, the aqueous solution is maintained at a concentration of from about 3 to about 3.5 Normal hydrochloric acid. Ammonium thiocyanate is added, preferably as an aqueous solution, to the zirconium oxychloride-containing solution to produce thiocyanic acid.

Advantageously, the high chloride anion concentration of the zirconium oxychloride-containing solution has been found to drive the thiocyanic acid into the organic solvent with the high concentration of chloride anions not significantly depressing the transfer of the thiocyanic acid. Also, the zirconium oxychloride-containing stream may be a normal process stream which may be recycled from a previous process run to a later (in time) start-up and then processed in the normal course without generating additional start-up wastes in the extraction operation. Further, the recycled oxychloride-containing process stream may have a chloride ion concentration of from about 1.6 Normal to about 3.5 Normal (as HCl) so that the process stream may function as the base for producing the thiocyanic acid. Thus, the hydrochloric acid addition will only needed to maintain the chloride ion concentration of the start-up solution. This is important to the economics of the process because hydrochloric acid is generally more expensive than sulfuric acid.

DESCRIPTION OF THE FIGURE

The invention will become more readily apparent from the following description of a preferred practice thereof, shown by way of example only, in the accompanying process flow diagram.

DESCRIPTION OF A PREFERRED PRACTICE

The accompanying process flow diagram shows two packed columns 10 and 11 connected in series flow which may be employed in the practice of the present invention to make up an organic scrubbing solution before starting-up a hafnium extraction system. The columns 10 and 11 are preferably inline production units of a commercial hafnium extraction system which may be employed in the production of nuclear grade zirconium or in the production of hafnium or their oxides.

One or more packed columns may be employed in place of two columns 10 and 11 depending upon process conditions well known in the chemical engineering field.

Each column 10 and 11 may be packed in customary manner with standard 2" diameter ceramic packing, which facilitates mixing of a process stream generally comprising an aqueous zirconium oxychloride-containing solution having a chloride anion concentration of at least about 1.6 Normal (as HCl) with a countercurrently flowing barren organic solvent stream. In a preferred practice, the stream is maintained between about 3 and 3.5 Normal hydrochloric acid. Preferably, the aqueous solution is substantially free of hafnium values so that the scrub solvent may most quickly be build up to about 2-3 Molar thiocyanic acid. Thus, the aqueous solution should contain less than about 100 ppm hafnium and, more preferably, less than about 50 ppm hafnium. As shown, the aqueous solution may be pumped via lines 12 from an aqueous solution feed tank 13 by pump 14 through column 11 and then column 10 and back into the feed tank 13.

Barren organic solvent (preferably methyl isobutyl ketone or the like) may countercurrently be circulated by a pump 26 via lines 15 from a barren solvent feed tank 16 to column 10 and then to column 11 In the preferred practice, the concentration of the organic solvent from the second column 11 is at least about 2-3 Molar thiocyanic acid, and preferably between 2.2 and 2.5, so that the organic solvent may be pumped directly to a scrub solvent storage tank 17 for later use in the start up. If, however, the thiocyanic acid concentration in the organic solvent from the second column does not satisfy the process specification, then a valve 21 in line 15 may be closed and a valve 22 in a recirculation line 20 may be opened so that the solvent may be recirculated back to the barren solvent feed tank 16. The barren solvent may be initially fresh or regenerated. The barren solvent will typically contain substantially less than 1 Molar thiocyanic acid and fresh MIBK typically will contain no more than trace amounts of thiocyanic acid, if any.

The hydrochloric acid may be provided from any suitable source such as an acid feed tank 18 and a feed pump 28. The hydrochloric acid must be sufficiently concentrated to produce a 1.6 Normal chloride ion concentration in the oxychloride-containing stream. Preferably, concentrated hydrochloric acid is employed so that the oxychloride-containing stream is not unnecessarily diluted.

Ammonium thiocyanate (NH4SCN) may be added as an aqueous solution from a suitable source such as a make up tank 19 and a feed pump 29.

The start-up solution is preferably made up by circulating an aqueous zirconium oxychloride-containing stream through the columns 10 and 11 in continuous (for the time needed to accumulate the required amount of start up scrub solvent) countercurrent flow to an originally barren organic solvent stream. Concentrated hydrochloric acid is preferably added to maintain the hydrochloric acid concentration of the aqueous stream at 1.6 Normal or more. Ammonium thiocyanate is added to the aqueous stream to produce thiocyanic acid in the aqueous stream. Advantageously, the thiocyanic acid quickly transfers into the barren organic solvent. Preferably, the start-up scrubbing solution made up in accordance with the practice of the present invention will contain about 2.2-2.3 Molar SCN for later scrubbing the hafnium values from the mixed oxychloride-containing stream.

The present invention will produce a scrub solvent containing 2-3 Molar thiocyanic acid in about eight hours or less. The process flow diagram depicts a facility in which the present invention has been employed to make up scrub solvent in six hours. An earlier start up of the same facility employing concentrated sulfuric acid produced a solvent containing less than about 1.3 Molar thiocyanic acid after three or four days of operation with high losses of ammonium thiocyanate.

While a presently preferred practice of the present invention has been shown and described, it is to be distinctly understood that the invention is not limited thereto but may be otherwise practiced within the scope of the following claims of invention.

What is claimed is:

1. A process of making up an organic scrub solvent for use in a liquid-liquid extraction process wherein a mixed zirconium and hafnium oxychloride-containing aqueous solution is scrubbed with said organic scrub solvent to extract said hafnium from said aqueous solution, the improvement comprising the steps of:
   countercurrently contacting an aqueous zirconium oxychloride-containing stream having a hafnium ion concentration of less than about 100 ppm with a barren organic solvent stream;
   adding hydrochloric acid to the aqueous zirconium oxychloride-containing stream to maintain a chloride anion concentration of at least about 1.6 Normal (as HCl) in the aqueous stream; and
   adding ammonium thiocyanate to the aqueous zirconium oxychloride-containing stream to produce thiocyanic acid;
   whereby the thiocyanic acid transfers to the barren organic solvent stream to produce a scrub solvent.

2. The improvement of claim 1, wherein the scrub solvent produced by the process has a thiocyanic acid concentration of from about 2 to about 3 Molar.

3. The improvement of claim 1, wherein the scrub solvent produced by the process has a thiocyanic acid concentration of from about 2.3 to about 2.5 Molar.

4. The improvement of claim 1, wherein the aqueous zirconium oxychloride-containing solution contains less than about 50 ppm hafnium ions.

5. The improvement of claim 1, wherein the barren organic solvent comprises methyl isobutyl ketone.

6. The improvement of claim 1, wherein the zirconium oxychloride-containing stream has a chloride znion concentration of from about 3.0 to about 3.5 Normal (as HCl).

7. The improved process of claim 1, wherein the thiocyanic acid concentration in the scrub solvent is at least about 2.0 Molar.

8. The improved process of claim 7, wherein the 2.0 Molar thiocyanic acid-containing scrub solvent is produced in less than about eight hours.

* * * * *